United States Patent
Pung et al.

(10) Patent No.: US 8,629,196 B2
(45) Date of Patent: *Jan. 14, 2014

(54) CLEANING IMPLEMENT BASED ON MELAMINE-FORMALDEHYDE FOAM COMPRISING HOLLOW MICROSPHERES

(75) Inventors: David John Pung, Loveland, OH (US); Denis Alfred Gonzales, Brussels (BE); Tobias Heinz Steinke, Speyer (DE); Peter Nessel, Ludwigshafen (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,963

(22) Filed: May 16, 2012

(65) Prior Publication Data
US 2012/0291801 A1 Nov. 22, 2012

Related U.S. Application Data

(60) Provisional application No. 61/486,414, filed on May 16, 2011.

(51) Int. Cl.
*C08J 9/32* (2006.01)
*C08J 9/16* (2006.01)
*C08J 9/228* (2006.01)
*C08J 9/00* (2006.01)
*C08G 14/00* (2006.01)
*C08G 18/00* (2006.01)

(52) U.S. Cl.
USPC ............ 521/187; 521/188; 521/118; 521/181

(58) Field of Classification Search
USPC ................... 521/187, 188, 118, 181
See application file for complete search history.

(56) References Cited

U.S. PATENT DOCUMENTS

| | | | | |
|---|---|---|---|---|
| 4,595,623 A | * | 6/1986 | Du Pont et al. | 428/195.1 |
| 5,162,397 A | * | 11/1992 | Descamps et al. | 523/219 |
| 5,916,927 A | * | 6/1999 | Minagawa et al. | 521/54 |
| 2007/0157405 A1 | | 7/2007 | Bogaerts et al. | |
| 2007/0161533 A1 | | 7/2007 | Gonzales et al. | |
| 2010/0234480 A1 | * | 9/2010 | Hahn et al. | 521/94 |

FOREIGN PATENT DOCUMENTS

| | | | | | |
|---|---|---|---|---|---|
| DE | 10 2005 029745 A1 | | 12/2006 | | |
| DE | 102007009127 | * | 9/2007 | | C08L 61/28 |
| EP | 1914269 A1 | * | 4/2008 | | C08J 9/36 |

* cited by examiner

Primary Examiner — Randy Gulakowski
Assistant Examiner — Kara Boyle
(74) Attorney, Agent, or Firm — John T. Dipre; Steven W. Miller

(57) ABSTRACT

The present invention relates to a cleaning implement based on melamine-formaldehyde foam comprising hollow microspheres, wherein said hollow microspheres have a median particle diameter ($D_{50}$, volume averaged, Malvern, Fraunhofer diffraction) in the range from 260 μm to 490 μm, and wherein the hollow microsphere are at least partly filled with a benefit agent. Additionally the present invention encompasses a method for cleaning a hard surface with a cleaning implement according to the present invention.

7 Claims, 1 Drawing Sheet

CLEANING IMPLEMENT BASED ON MELAMINE-FORMALDEHYDE FOAM COMPRISING HOLLOW MICROSPHERES

CROSS REFERENCE TO RELATED APPLICATION

This application claims the benefit of U.S. Provisional Application No. 61/486,414, filed May 16, 2011, the substance of which is incorporated herein by reference.

TECHNICAL FIELD

The present invention relates to cleaning implement based on melamine-formaldehyde foams comprising hollow microspheres.

BACKGROUND OF THE INVENTION

Recently, a novel application for such melamine-formaldehyde foams in the area of hard surface cleaning has been discovered. Indeed, cleaning implements of cut or molded pieces of such melamine-formaldehyde foam, and in particular melamine foam, have become popular to remove soils and/or stains from hard surfaces (i.e., cleaning of hard surfaces) such as tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on. Indeed, melamine foam sponges are currently marketed under the tradename Mr. Clean Magic Eraser®.

It is has been observed that melamine-formaldehyde foam in particular shows good soil and/or stain removal performance when used to clean hard surfaces, on stains/soils such as marks on walls and furniture. Indeed, it has been observed that melamine foam in particular, when wetted with an appropriate solvent, such as tap water, removes soils and/or stains from a hard surface when said hard surface is brought into contacted with said wetted modified open-cell foam. By "bringing into contact" it is meant wiping, swiping, rubbing or the like. In order for the melamine foam in particular to optimally remove soils and/or stains from hard surfaces substantial amounts of an appropriate solvent, such as tap water, have to be used. Most commonly, tap water is used by the users of melamine foam when removing soils and/or stains from hard surfaces. When used with water or any other appropriate solvent, the melamine foam in particular comes off as small particles (meaning, the foam crumbles) when brought into contact with a hard surface. Indeed, a milky suspension of small modified melamine foam in particular particles in water is formed. However there has been the need for better soil and/or stain removal with better durability upon use.

It is therefore, an objective of the present invention to provide a cleaning implement, wherein said implement is capable of (improved) cleaning greasy soap scum soils and neat kitchen dirt (grease) from hard surfaces whilst providing a good surface safety profile and at the same time showing excellent durability upon use.

It has been now found that above objective can be met by use of cleaning implement based on melamine-formaldehyde foams comprising hollow microspheres, wherein said hollow microspheres have a median particle diameter ($D_{50}$, volume averaged, Malvern, Fraunhofer diffraction) in the range from 260 µm to 490 µm and wherein the hollow microspheres are at least partly filled with a benefit agent. Indeed, the objectives are met by cleaning implement according to present invention based on such melamine-formaldehyde foam, the method of cleaning hard surfaces with such a cleaning implement or the method of cleaning hard surfaces with the melamine-formaldehyde foams according to present invention.

The melamine-formaldehyde foams of the present invention have good mechanical foam properties and better fixation of the hollow microspheres in the foam particularly at high loadings, i.e., hollow microsphere contents and any associated benefit agent. Furthermore, the hollow microspheres can be incorporated in the foam in the course of foam production without additional process step.

The articles, processes and uses according to the present invention will now be described.

SUMMARY OF THE INVENTION

The present invention relates to a cleaning implement (1) based on melamine-formaldehyde foam comprising hollow microspheres (5), wherein said hollow microspheres have a median particle diameter ($D_{50}$, volume averaged, Malvern, Fraunhofer diffraction) in the range from 260 µm to 490 µm, and wherein the hollow microspheres are at least partly filled with a benefit agent.

The present invention further encompasses a method for cleaning a hard surface with a cleaning implement according to the present invention.

DETAILED DESCRIPTION OF THE INVENTION

Cleaning Implement

Figure 1:
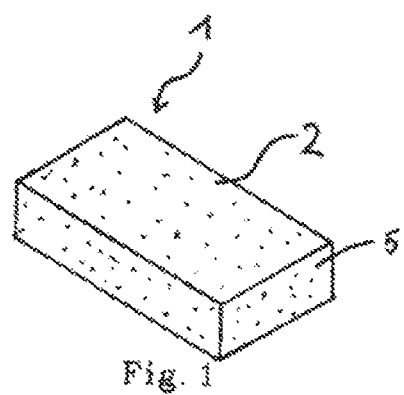
FIG. 1 is a perspective view of a cleaning implement (1).

The cleaning implement (1) herein is based on the melamine-formaldehyde foam comprising hollow microspheres (5), wherein the hollow microspheres (5) are at least partly filled with benefit agent.

By a "cleaning implement" it is meant herein an article of manufacture of any suitable shape and/or size and/or volume suitable for cleaning, i.e., removing spots and/or stains from hard surfaces. In a highly preferred embodiment according to the present invention, the cleaning implement herein is in a shape and/or size and/or volume suitable for use by a consumer to clean hard surfaces therewith. Examples of cleaning implements are wipers, brushes, cleaning cloths or cleaning granules.

In a preferred embodiment, the cleaning implements herein are suitable for cleaning/cleansing inanimate surfaces selected from the group consisting of household hard surfaces; dish surfaces; surfaces like leather or synthetic leather; and automotive vehicles surfaces.

In a highly preferred embodiment, the cleaning implements herein are suitable to clean household hard surfaces.

By "household hard surface", it is meant herein any kind of surface typically found in and around houses like kitchens, bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, Inox®, Formica®, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments.

Suitable shapes of the cleaning implements (1), such as a wiper, herein may be selected from the group consisting of: cube shape, rectangular shape, pyramid shape, cylindrical shape, cone shape, pencil eraser shape, cuboid shape, tetrahedron shape; sphere shape; globular shape; and ellipsoid shape. Preferably, said cleaning implement has a shape selected from the group consisting of: cube shape, rectangular shape, pencil eraser shape, and cuboid shape.

Suitable volumes of the cleaning implements herein may be from 1 $cm^3$ to 10,000 $cm^3$, preferably from 10 $cm^3$ to 1,000 $cm^3$, more preferably from 150 $cm^3$ to 250 $cm^3$.

In a highly preferred embodiment herein, the cleaning implement (1) herein has a cuboid shape defined by three groups of parallel and equal length sides, referred to as a, b and c, wherein a ranges from 2 cm to 20 cm, preferably 4 cm to 8 cm, b ranges from 2 cm to 20 cm preferably 8 cm to 15 cm, and c ranges from 1.5 cm to 5 cm, preferably 2 cm to 4 cm.

In a preferred embodiment according to present invention, the thickness of said melamine-formaldehyde foam comprising hollow microspheres foam (2) layer is from 5 mm to 100 mm, preferably from 7 mm to 50 mm, more preferably 10 mm to 50 mm even more preferably from 15 mm to 50 mm, still more preferably from 20 mm to 40 mm.

The cleaning implement (1) of a first embodiment of the present invention as shown in FIG. 1 comprises a single layer (2) of melamine-formaldehyde foam comprising hollow microspheres (5).

In a preferred embodiment according to the present invention the cleaning implements herein may comprise additional layers of material. Preferably, in the cleaning implement herein said melamine-formaldehyde foam (2) comprising hollow microspheres (5) forms a first layer and said cleaning implement additionally comprises a second layer of material. Even more preferably, said second layer of material is a second foam layer (3) made of a second foam material as discussed herein below. Such a cleaning implement according to this preferred embodiment is shown in FIG. 2.

The layers of melamine-formaldehyde foam (2) comprising hollow microspheres (5) and second foam (3) may be arranged in said cleaning implement in any way suitable. In a preferred embodiment according to present invention the layers of melamine-formaldehyde foam (2) comprising hollow microspheres (5) and second foam (3) are arranged parallel to at least one side, preferably two opposite sides, of the cleaning implement. However, the cleaning implement may also have an irregular shape. Indeed, the thickness of the layers may be constant or vary throughout the cleaning implement. The separation line (4) between the two layers may form a straight line or may form a bend or be completely irregular. In addition, the separation plane of the layers may be in the center of cleaning implement, dividing the implement in two equal parts, or may be in the upper or lower part of the implement. In addition, the cleaning implement may be in the shape of a sphere or a globule or an ellipsoid with the separation plane of the layers forming a spherical segment or one of the layers, preferably the layer of a second foam here, forming a sphere in a sphere (similar to the layers of an onion).

Figure 2:
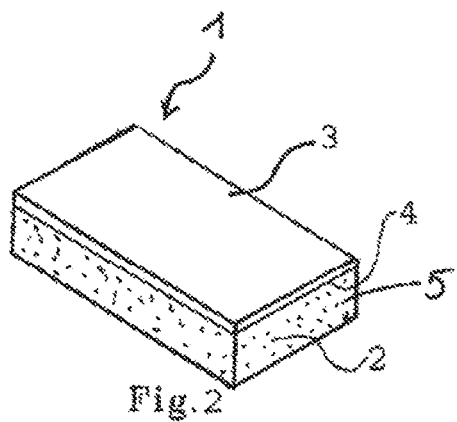
FIG. 2 is a perspective view of a cleaning implement (1) comprising two layers.

In this highly preferred embodiment of the present invention, wherein the cleaning implement (1) herein has a cuboid shape, the line indicating the separation (4) of the two layers (or the surface areas where the two layers are joined together) of the implement is preferably substantially parallel (preferably parallel) to the side of the cuboid shaped implement having the largest surface area (as shown in FIG. 2).

In another highly preferred embodiment herein the cleaning implement herein is in the shape of a pencil eraser. By "shape of a pencil eraser" it is meant herein a voluminous body having six walls, wherein three pairs of parallel and equally shaped and sized walls exist and wherein one pair of walls are in the shape of a parallelogram and the remaining two pairs of walls are of rectangular shape. In this preferred embodiment, wherein the cleaning implement herein has the shape of a pencil eraser, the line indicating the separation of the two layers (or the surface areas where the two layers are joined together) of the implement is preferably substantially parallel (preferably parallel) to the side of implement in the shape of a pencil eraser having the largest surface area.

In order to obtain suitable cleaning implements according to a preferred embodiment of the present invention, the melamine-formaldehyde foam layer (2) comprising hollow microspheres (5) and the second layer of second foam (3) have to be attached to each other. This attachment can be achieved by any attachment means suitable for joining the two layers. The attachment may be either a permanent attachment (wherein the two layers cannot be separated without inflicting substantial damage to the layers) or temporary attachment (wherein the two layers may be separated without inflicting substantial damage to the layers). Suitable attachment means providing a permanent attachment are selected from the group consisting of: foam flame laminating the two layers together; use of a permanent adhesive; sewing the two layers together; and needle-punching the two layers together; and combinations thereof. Suitable attachment means providing a temporary attachment are selected from the group consisting of: a weak adhesive; Velcro; and a water-based, water-soluble coating or adhesive; and combinations thereof.

In a preferred embodiment here, the attachment of layers herein is a permanent attachment.

Foam flame lamination is a continuous process that can adhere foams and additional materials, if any, to one or both sides of foam in a single pass. The process of flame lamination involves the passing of first foam (either the melamine-formaldehyde foam comprising hollow microspheres herein or the second foam herein) over an open flame, which creates a thin layer of molten foam/polymer. Second foam (either the second foam herein or the melamine-formaldehyde foam comprising hollow microspheres herein, depending on the first step) is pressed against the first foam while it is still in the molten state. Foams and additional material, if any, can be adhered to one or both sides of the foam in a single pass. Furthermore, additional passes are optional. The strength of the bond depends upon the foams and additional material, if any, selected and the processing conditions (i.e., gas type, flame height and spread, foam burn-off and nip pressure).

The cleaning implement according to the present invention may contain more than two layers, wherein said additional layers, if, any, may be of the same or similar materials as the melamine-formaldehyde foam comprising hollow microspheres or said second foam, or may be made of another material having similar properties as said second foam or different properties therefore. Indeed, the cleaning implement herein may be in a so-called sandwich configuration, wherein three layers are present. In a preferred embodiment, wherein the cleaning implement herein is in a sandwich configuration, the middle layer may be said second foam and at least one of the two outer layers is melamine-formaldehyde foam comprising hollow microspheres with the second outer layer being either melamine-formaldehyde foam comprising hollow microspheres or another material providing other feature, such as abrasiveness or increased rigidity. In a highly preferred embodiment according to the present invention the cleaning implement herein comprises two outer layers of said melamine-formaldehyde foam comprising hollow microspheres and an inner layer, preferably of a second foam material, as discussed herein below.

The layers of the cleaning implement according to the present invention may cover each other either partially or fully. By a "partial coverage" it is meant that at least one of the layers overlaps the other layer (or other layers, if any) and is not fully covered by said other layer (or other layers, if any). By a "full coverage" it is meant that the layers of the cleaning implement do fully cover each other and that none of the layers substantially overlap the other layer (or other layers, if any).

The ratio of said melamine-formaldehyde foam comprising hollow microspheres to said second foam in the cleaning implement according to the present invention is preferably from 20:1 to 1:20 by volume, more preferable from 10:1 to 1:10 by volume, even more preferably 5:1 to 1:1, still more preferably 5:1 to 2:1, and most preferably from 4:1 to 3:1 by volume.

In order to obtain suitable cleaning implements according to the present invention, the melamine-formaldehyde foam comprising hollow microspheres—and second foam-raw materials may have to be modified in shape and/or size. This modification can be done by any means known to those skilled in the art. Suitable means of modifying the shape and/or size of melamine foam- and second foam-raw materials may be selected from the group consisting of: cutting, breaking, and tearing, and combinations thereof.

Melamine-formaldehyde foams as such and their production and also hollow microspheres as such and their production are known to a person skilled in the art and described in the literature.

The melamine-formaldehyde foams of the present invention comprise hollow microspheres and these hollow microspheres in accordance with an essential requirement have a median particle diameter ($D_{50}$, volume averaged, Malvern, Fraunhofer diffraction) in the range from 260 μm to 490 μm, preferably in the range from 280 μm to 450 μm and more preferably in the range from 300 μm to 400 μm.

The hollow microsphere content is generally in the range from 0.1% to 60% by weight, preferably in the range from 5% to 50% by weight and more preferably in the range from 10% to 30% by weight, the weight all being based on the total weight of hollow microspheres and melamine-formaldehyde precondensate used for foam production.

The melamine-formaldehyde foams have an open-cell foam scaffold comprising a multiplicity of interconnected, three-dimensionally branched struts (the points of connection between the struts being known as "nodes" or "nodal points"). The hollow microsphere median particle diameter which is essential to the present invention and the herein below described production process for the melamine-formaldehyde foams of the present invention cause the hollow microspheres to become preferentially embedded into the open-cell pores of the foam structure. Incorporation into the struts or nodes of the foam scaffold does not take place to any significant extent, if at all. As a result, good fixation of the hollow microspheres in the foam is achieved even at high hollow microsphere contents without the mechanical properties of the foam becoming excessively affected.

The melamine-formaldehyde foams of the present invention comprising hollow microspheres are preferably obtainable by the consecutive process steps a) and b):

a) heating to foam up and crosslink a mixture comprising a melamine-formaldehyde precondensate having a molar ratio of melamine:formaldehyde in the range of typically from 1:1.3 to 1:5 and preferably from 1:1.5 to 1:3.5, the hollow microspheres, a curative, a dispersant and a blowing agent, and b) drying the foam obtained in process step a), wherein these process steps and also the melamine-formaldehyde precondensates, curatives, dispersants and blowing agents useful in step a) are known in principle to a person skilled in the art and are described in the literature.

The melamine-formaldehyde precondensate in addition to melamine and formaldehyde may comprise up to 50% by weight and preferably up to 20% by weight (all based on the weight of cocondensed melamine) of other thermoset-formers and up to 50% by weight and preferably up to 20% by weight (all based on the weight of cocondensed formaldehyde) of other aldehydes in cocondensed form. Useful thermoset-formers include for example: alkyl- and aryl-alkyl-substituted melamine, urea, urethanes, carboxamides, dicyandiamide, guanidine, sulfurylamide, sulfonamides, aliphatic amines, glycols, phenol and its derivatives. Examples of useful other aldehydes are acetaldehyde, trimethylolacetaldehyde, acrolein, benzaldehyde, furfurol, glyoxal, gluteraldehyde, phthalaldehyde and terephthalaldehyde. Particular preference is given to an unmodified melamine-formaldehyde precondensate, i.e., a melamine-formaldehyde precondensate devoid of any other thermoset-formers or other aldehydes. Further details concerning melamine-formaldehyde condensation products may be found in Houben-Weyl, Methoden der organischen Chemie, volume 14/2, 1963, pages 319 to 402.

Commercially available melamine-formaldehyde precondensates are useful for a multiplicity of fields of use, for example for further processing into glues. Melamine-formaldehyde precondensates comprising sulfite groups are advantageous for use in some of these fields. Such sulfite group-containing melamine-formaldehyde precondensates are obtainable for example as described in EP-B 37470 whereby from 1% to 20% by weight of sodium disulfite is incorporated in the course of the condensation of melamine and formaldehyde to obtain cocondensed sulfite groups. For the processes of the present invention, however, it is advantageous that step a) utilizes a precondensate which is free of the sulfite groups.

Emulsification of the blowing agent and stabilization of the foam in step a) requires the addition of a dispersant, e.g., an emulsifier or emulsifier mixture. Useful emulsifiers include anionic, cationic and nonionic surfactants and also mixtures thereof.

Suitable anionic surfactants are diphenylene oxide sulfonates, alkane- and alkylbenzenesulfonates, alkylnaphthalenesulfonates, olefinsulfonates, alkyl ether sulfonates, fatty alcohol sulfates, ether sulfates, alpha-sulfo fatty acid esters, acylaminoalkanesulfonates, acyl isethionates, alkyl ether carboxylates, N-acylsarcosinates, alkyl and alkyl ether phosphates. Useful nonionic surfactants include alkylphenol polyglycol ethers, fatty alcohol polyglycol ethers, fatty acid polyglycol ethers, fatty acid alkanolamides, EO-PO block copolymers, amine oxides, glycerol fatty acid esters, sorbitan esters and alkylpolyglucosides. Useful cationic emulsifiers include alkyltriammonium salts, alkylbenzyldimethylammonium salts and alkylpyridinium salts. The emulsifiers are preferably added in amounts of 0.2% to 5% by weight, based on the melamine-formaldehyde precondensate.

For the melamine-formaldehyde precondensate, which is preferably used in the form of an aqueous solution or dispersion, to produce foam in step a), it has to comprise a blowing agent, the amount depending on the desired density of the foam. In principle, the process of the present invention can utilize both physical blowing agents and chemical blowing agents. Useful physical blowing agents include, for example, hydrocarbons, halogenated and more particularly fluorinated hydrocarbons, alcohols, ethers, ketones and esters in liquid form or air and $CO_2$ as gases. Useful chemical blowing agents include, for example, isocyanates mixed with water, in which case $CO_2$ is released as an effective blowing agent, moreover carbonates and bicarbonates mixed with acids, which likewise produce $CO_2$, and also azo compounds, such as azodicarbonamide. In one preferred embodiment of the present invention, the aqueous solution or dispersion of the melamine-formaldehyde precondensate is admixed with between 1% and 40% by weight, based on the melamine-formaldehyde precondensate, of a physical blowing agent having a boiling point of between 0 and 80° C.; in the case of pentane, the amount used is preferably in the range from 5% to 15% by weight.

Curatives used in step a) comprise acidic compounds catalyzing the continued condensation of the melamine-formaldehyde precondensate. The amounts are between 0.01% and 20% by weight and preferably between 0.05% and 5% by weight, based on the melamine-formaldehyde precondensate. Organic and inorganic acids can be used, examples being hydrochloric acid, sulfuric acid, phosphoric acid, nitric acid, formic acid, acetic acid, oxalic acid, toluenesulfonic acids, amidosulfonic acids and also acid anhydrides.

The aqueous solution or dispersion of the melamine-formaldehyde precondensate used in step a) is preferably free of further added substances. However, it can be beneficial for some purposes to add up to 20% by weight, and preferably less than 10% by weight, based on the melamine-formaldehyde precondensate, of customary added substances, such as dyes, flame retardants, UV stabilizers, agents to lower combustion gas toxicity or to promote carbonization. Since the foams are generally open celled and capable of imbibing water, some applications make it necessary to add hydrophobicizers in amounts of 0.2% to 5% by weight. Useful hydrophobicizers include for example silicones, paraffins, silicone surfactants, fluorosurfactants, hydrophobic hydrocarbonaceous surfactants, silicone emulsions and fluorocarbon emulsions.

The concentration of the melamine-formaldehyde precondensate in the mixture of precondensate and solvent/dispersant, more particularly water, can vary within wide limits between 55% and 85% by weight and preferably between 63% and 80% by weight, all based on the total weight of melamine-formaldehyde precondensate and solvent/dispersant. The preferred viscosity of the mixture of precondensate and solvent/dispersant is between 1 and 3000 dPa·s and preferably between 5 and 2000 dPa·s.

The hollow microspheres and further mixture components are mixed with the aqueous solution or dispersion of the melamine-formaldehyde precondensate to form a homogeneous mixture, with the blowing agent being forced in under pressure if necessary. However, it is also possible to start with a solid, for example spray-dried, melamine-formaldehyde precondensate and to subsequently mix it with a dispersion of the hollow microspheres and/or with an aqueous solution of the emulsifier, with the curative and also with the blowing agent. After mixing, the heated resin mixture with the dispersed blowing agent is discharged through a die and foams up thereafter.

Foaming of the blowing agent-containing solution or dispersion upon emergence from the die is augmented—as described in EP-B 17671—by means of hot air or high frequency irradiation. Preferably, the energy can be input by electromagnetic radiation, for example by high frequency irradiation with 5 to 400 kW, preferably 5 to 200 kW, particularly preferably 9 to 120 kW per one kilogram of the mixture used in a frequency range of 0.2 to 100 GHz, preferably 0.5 to 10 GHz. Magnetrons are a suitable source of radiation for dielectric radiation, with one or more magnetrons being able to be irradiated at the same time.

The mixture to be foamed is irradiated immediately on emerging from the foaming die. The blowing agent evaporates the resin mixture foams up and at the same time cures through.

The foams produced are finally dried to remove water and blowing agent remaining in the foam.

In a further embodiment of the process according to the present invention, process step b) may be followed by a process step c) in which the dried foam is press molded to make it elastic.

Process step c) is known in principle to a person skilled in the art and is described in the literature, for example in EP-A 1 505 105 and EP-B 37470.

The foam blocks or sheets obtained can optionally be thermocompressed in a further process step. Thermocompression as such is known to a person skilled in the art and described for example in WO 2007/031944, EP-A 451 535, EP-A 111 860 and U.S. Pat. No. 6,608,118. Thermocompression can often provide better fixation of the hollow microspheres in the foam structure.

Preferred hollow microspheres for producing the melamine-formaldehyde foams of the present invention have walls consisting of a polymer, an inorganic material or a combination of inorganic material and polymer (by adhering inorganic materials for example).

Polymers suitable for the hollow microsphere walls are preferably polyurethane, melamine-formaldehyde resin, epoxy resin, polyester, polycarbonate, polyacrylates, polyamides or mixtures thereof.

Inorganic materials useful as hollow microsphere walls are preferably silicates, particularly those of aluminum, of calcium, of magnesium and/or of zirconium, oxides such as aluminum oxide, quartz, magnesite, mullite, chromite, zirconium oxide and/or titanium oxide, borides, carbides and nitrides such as silicon carbide, titanium carbide, titanium boride, boron nitride and/or boron carbide, carbon or glass and more preferably glass.

The hollow microspheres are at least partly and more particularly fully filled with one or more solid or liquid benefit agent. Benefit agents are for example a detergent compositions, hence are capable of improving the cleaning properties of the cleaning implement (1) based on melamine-formaldehyde foams; or else surfactants; dyes, for example inks and pigments; scents; acids; bases; oils; salts; bleach; antimicrobial agents; fragrances; solvents; biocides, which are released by destruction of the hollow microsphere walls to develop their benefit for the particular desired use and mixtures thereof. Further usable benefit agents known per se to a person skilled in the art are for example hydrophobicizing agents; agents influencing haptics or the soil release behavior (to obtain the so-called lotus effect for example); formaldehyde scavengers; abrasives such as inorganic nanoparticles for example (see WO 2009/021963 for example) or synthetic abrasives; or catalysts and mixtures thereof.

Preferred hollow microspheres comprising wall material based on a highly cross linked methacrylic ester polymer are known from EP-A-1 029 018, DE-A-101 39 171 and WO-A-2005/116559. They all relate to microencapsulated latent heat storage materials in different fields of use. EP-A-1 029 018 teaches the use in bindered building materials such as concrete or gypsum, DE-A-101 39 171 teaches the use of microencapsulated latent heat storage materials in gypsum board, and WO-A-2005/116559 teaches their use in chipboard. The hollow microspheres described in these references all are said to have high imperviousness in thermal treatment, chemical treatment and under pressure.

Hollow microspheres are obtainable via a so-called in situ polymerization for example. The basis for the principle of hollow microsphere formation is that the monomers, a free-radical initiator, a protective colloid and the lipophilic substance to be encapsulated are combined to form a stable oil-in-water emulsion. Then, the polymerization of the monomers is started by heating and optionally controlled via further temperature elevation, the resulting polymers forming the hollow sphere wall which encloses the lipophilic substance. This general principle is described for example in DE-A-10 2007 055 813, WO2008071649 and DE-A-101 39 171, the content of which is hereby expressly incorporated herein by reference.

DE-A-10 2007 055 813 describes the production and use of thermally destructible hollow microspheres, which are likewise preferred. The hollow microsphere wall is constructed of acrylates. The hollow microsphere interior contains lipophilic substances, such as aliphatic and aromatic hydrocarbon compounds, saturated or unsaturated $C_6$-$C_{30}$ fatty acids, fatty alcohols, $C_5$-$C_{30}$ fatty amines, fatty acid esters, natural and synthetic waxes, halogenated hydrocarbons, silicone oils, adhesives, aroma chemicals, scents, active substances, dyes, color formers, pigments and crosslinkers.

The weight ratio of hollow microsphere interior to hollow microsphere wall, i.e., the core/wall ratio, is generally in the range from 50:50 to 95:5, preferably in the range from 70:30 to 95:5 and more preferably in the range from 75:25 to 93:7.

The melamine-formaldehyde foams obtained according to the present invention generally have a density in the range from 3 to 100 g/l and more preferably have a density in the range from 5 to 50 g/l.

The present invention melamine-formaldehyde foams comprising hollow microspheres are obtainable batchwise or preferably continuously as sheets or webs in generally any desired thickness, advantageously in layer thicknesses ranging from 0.1 to 500 cm, preferably from 0.5 to 200 cm, more preferably from 1 to 100 cm, more particularly from 3 to 80 cm and most preferably from 5 to 50 cm. Moldings comprising melamine-formaldehyde foams according to the present invention are obtainable in a continuous manner and preferably in a batchwise manner.

The melamine-formaldehyde foams in the form of webs, sheets, moldings or some other form can be laminated or endowed with surface layers by generally customary methods on one, two, more or all sides, for example with paper, paperboard, glass overlay matt, wood, plasterboard, metal sheet or metal foil, plastic or self-supporting plastics foam/sheet, which may optionally also be foamed. The surface layers can be applied in the course of foaming or subsequently. In the case of subsequent application, it is advantageous to use an adhesion promoter.

When the melamine-formaldehyde foams of the present invention comprise hollow microspheres filled with benefit agent to be released, this release can be affected at any desired time by applying a suitable mechanical or thermal action to the foam. For example, the above-described benefit agents, for example detergent compositions, surfactants, inks, scents or biocides, acids, bases, bleaches, water, solvents, waxes, pigments, dyes, fragrances, oils, salts and mixtures thereof, can be released through thermal (e.g., hot air, various forms of radiation, for example infrared or microwave radiation) or mechanical destruction (pressing, rolling, ultrasound, etc) of the hollow microsphere walls. This releases the contents of the hollow microspheres uniformly or almost uniformly and causes wetting of the surface structure (struts and nodes) even in the interior of the open-cell melamine-formaldehyde foam structure. The processes for thermal or mechanical destruction of microcapsule walls are known in principle to a person skilled in the art, and are described in the literature. For example, the foam can be compression molded to destroy the microcapsule walls, as described in EP-A 0451535 for example, by leading the foam through a defined gap between two contra-rotating rolls in parallel alignment. In addition to leading the foam through a gap between two co-rotating rolls, it is also possible for the foam to be transported on a conveyor belt and for a roll—turning at the same circumferential speed as the speed of movement of the foam—to press down on the foam. The pressure on the foam can further be exerted by placing the foam for example into a press in which a ram presses down on the foam. In this case, however, continuous pressing is not possible.

The cleaning implement based on melamine-formaldehyde foams comprising hollow microspheres are used for cleaning hard surfaces.

The melamine-formaldehyde foams of the present invention exhibit more particularly even at high loadings, i.e., hollow microsphere contents and optionally associated benefit agent contents, good mechanical properties for the foam and better fixing of the hollow microspheres in the foam. Furthermore, the hollow microspheres can be incorporated in the foam in the course of foam production without additional process step.

Packaging Means

The cleaning implement herein may be combined in an article of manufacture with a packaging means.

The packaging means herein may be any suitable means known to package cleaning implements. Indeed, particularly suitable packaging means herein are selected from the group consisting of: paper bags, plastic bags, cartons, carton boxes, flow wraps, plastic wraps, and paper wraps, and the like and combinations thereof.

The packaging means herein may be printed and/or modified. In particular, such printing and/or other modification may be used to associate a brand-name and/or logo of a hard surface cleaner with said cleaning implement.

Method of Cleaning a Hard Surface

In another embodiment the present invention encompasses method of cleaning a hard surface with a cleaning implement as described herein above.

In yet another embodiment herein, the present invention encompasses a method of cleaning a hard surface by bringing a cleaning implement according to the present invention into contact with said hard surface. By "cleaning" it is meant herein removing spots and/or stains from hard surfaces.

In still another embodiment herein, the present invention encompasses a method of cleaning a hard surface with cleaning implement according to the present invention.

Suitable hard surfaces herein are tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on.

The methods of cleaning a hard surface according to the present invention may additionally include the step of wetting said cleaning implement or said foam with an appropriate solvent, preferably tap water, more preferably water in combination with a detergent composition, prior to bringing said cleaning implement into contact with said hard surface.

EXAMPLES

Methods of Measurement

Mechanical Properties, Elasticity

Ram pressure measurements for evaluating the mechanical quality of the melamine resin foams were all carried out as described in U.S. Pat. No. 4,666,948. A cylindrical ram having a diameter of 8 mm and a height of 10 cm was pressed into a cylindrical sample having a diameter of 11 cm and a height of 5 cm in the direction of foaming at an angle of 90° until the sample tore. The tearing force [N], hereinafter also referred to as ram pressure value, provides information as to the quality of the foam.

Comparative Example V-1

Producing melamine-formaldehyde foam without hollow microspheres (according to WO-A-2009/021963):

75 parts by weight of a spray-dried melamine-formaldehyde precondensate (molar ratio 1:3) were dissolved in 25 parts by weight of water, then 3% by weight of formic acid, 2% by weight of a sodium $C_{12}/C_{14}$-alkyl sulfate, 38% by weight of pentane, all % by weight being based on the weight of the precondensate, were added, this was followed by stirring and then foaming in a polypropylene mold (for foaming) by irradiation with microwave energy. After foaming, the foam was dried for 30 minutes.

This melamine-formaldehyde foam had a density of 7.5 g/l and a ram pressure value of 18.9 N.

Inventive Example 4 and Comparative Examples V-2, V-3 and V-5

In each case, 75 parts by weight of a spray-dried melamine-formaldehyde precondensate (molar ratio melamine:formaldehyde 1:3) were dissolved in 25 parts by weight of water. This mixture was admixed with 3 parts by weight of formic acid, 2 parts by weight of a fatty alcohol polyglycol ether as surfactant, 38 parts by weight of pentane and 10% by weight (based on the total weight of the melamine-formaldehyde precondensate) of hollow glass microspheres based on soda-lime silicate glass having the mean particle diameters ($D_{50}$, volume averaged, Malvern, Fraunhofer diffraction) and bulk densities mentioned in table 1. This mixture was vigorously stirred and then foamed in a polypropylene foaming mold by irradiation with microwave energy at 2.54 GHz. The foams formed in each case were subsequently dried with hot air.

The properties of the melamine-formaldehyde foams obtained in each case are reported in table 1.

TABLE 1 amount and size of hollow microspheres and properties of melamine-formaldehyde foams

| Example | V-1 | V-2 | V-3 | 4 | V-5 |
|---|---|---|---|---|---|
| Hollow microsphere, amount [% by weight] | — | 10 | 10 | 10 | 10 |
| Hollow microsphere, median particle diameter ($D_{50}$, volume averaged, Malvern, Fraunhofer diffraction) [µm] | — | 50 | 190 | 360 | 650 |
| Bulk density [g/l] | — | 32 | 26 | 20 | 16 |
| Properties | | | | | |
| Density [g/l] | 7.5 | 7.5 | 7.9 | 7.5 | 6.9 |
| Ram pressure [N] | 18.9 | 11.2 | 14.6 | 18.5 | 15.1 |

Use of Melamine-Formaldehyde Foam Comprising Hollow Microspheres as Cleaning Implements or to Clean Hard Surfaces.

Cleaning Implement A

A single layer cleaning implement having a cuboid shape defined by three groups of parallel and equal length sides, referred to as a, b and c, with a being 6.5 cm, b being 12 cm, and c being 3 cm is cut from the foam according to present invention. The overall shape of Cleaning Implement A is similar to the cleaning implement of FIG. 1. Cleaning implement A comprising hollow microspheres comprising benefit agent.

Cleaning Implement A is used to clean hard surfaces. Indeed, Cleaning Implement A is wetted with water and thereafter brought into contact with the hard surface to be cleaned. Cleaning Implement A shows an excellent performance in removing greasy soap scum and neat kitchen dirt from said hard surface whilst providing adequate surface safety.

Cleaning Implement B

A dual layer cleaning implement having a cuboid shape defined by three groups of parallel and equal length sides, referred to as a, b and c, with a being 6.5 cm, b being 12 cm, and c being 4 cm is made by foam flame laminating a first layer of the foam according to present invention, having a thickness—side c—of 2 cm to a second layer of commercially available polyurethane foam, having a thickness—side c—of 1 cm. The two layers are joined together at the plane formed by sides a and b. The overall shape of Cleaning Implement B is similar to the cleaning implement of FIG. 2. Cleaning implement B comprising hollow microspheres comprising benefit agent.

Cleaning Implement B is used to clean hard surfaces. Indeed, Cleaning Implement B is wetted with water and thereafter the foam according to present invention side of Cleaning Implement B is brought into contact with the hard surface to be cleaned by rubbing said side over the area to be cleaned. The excessive amount of water is thereafter absorbed by the polyurethane layer of Cleaning Implement B by swiping the cleaned surface with said layer. Cleaning Implement B shows an excellent performance in removing greasy soap scum and neat kitchen dirt from said hard surface whilst providing adequate surface safety.

Cleaning Implement C

A dual layer cleaning implement having a cuboid shape defined by three groups of parallel and equal length sides, referred to as a, b and c, with a being 6.5 cm, b being 12.5 cm, and c being 2.5 cm is made by a permanent adhesive a first layer of hybrid foam according to present invention, having a thickness—side c—of 2 cm to a second layer of commercially available polyurethane foam, having a thickness—side c—of 0.5 cm. The two layers are joined together at the plane formed by sides a and b. The overall shape of Cleaning Implement C is similar to the cleaning implement of FIG. 2. Cleaning implement C comprising hollow microspheres comprising benefit agent.

Cleaning Implement C is used to clean hard surfaces. Indeed, Cleaning Implement C is wetted with water and thereafter the foam according to present invention side of Cleaning Implement C is brought into contact with the hard surface to be cleaned by rubbing said side over the area to be cleaned. The excessive amount of water is thereafter absorbed by the polyurethane layer of Cleaning Implement C by swiping the cleaned surface with said layer. Cleaning Implement C shows an excellent performance in removing greasy soap scum and neat kitchen dirt from said hard surface whilst providing adequate surface safety.

Use of Melamine Formaldehyde Foam Comprising Hollow Microspheres According to Present Invention to Clean a Hard Surface A piece of melamine-formaldehyde foam comprising hollow microspheres according to present invention is used to clean a hard surface by wetting a piece of said foam with water and thereafter bringing it into contact with the hard surface to be cleaned. The foam according the present invention shows an excellent performance in removing greasy soap scum and neat kitchen dirt from said hard surface, whilst providing surface safety.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning implement based on melamine-formaldehyde foam comprising hollow microspheres, wherein said hollow microspheres have a median particle diameter (D50, volume averaged, Malvern, Fraunhofer diffraction) in the range from 260 µm to 490 µm, and wherein the hollow microsphere are at least partly filled with a benefit agent.

2. The cleaning implement according to claim 1, wherein the hollow microsphere content is in the range from 0.1% to 60% by weight, wherein the percentages by weight are based on the total weight of hollow microspheres and melamine-formaldehyde precondensate used for foam production.

3. The cleaning implement according to claim 2, wherein the melamine-formaldehyde foam comprises open-cell pores and the hollow microspheres are embedded into the open-cell pores of the foam structure.

4. The cleaning implement according to claim 3, wherein the hollow microsphere walls consist of a polymer or of an inorganic material.

5. The cleaning implement according to claim 4, wherein the hollow microsphere walls consist of glass.

6. The cleaning implement according to claim 5, wherein benefit agent is selected from the group consisting of a detergent composition; surfactants; dyes; inks; pigments; scents; acids; bases; oils; salts; bleach; antimicrobial agents; fragrances; solvents; biocides; hydrophobicizing agents; agents influencing haptics; agents influencing the soil release behavior; formaldehyde scavengers; abrasives such as inorganic nanoparticles; synthetic abrasives; or catalysts and mixtures thereof.

7. A method of cleaning a hard surface comprising the steps of:
   a) providing a cleaning implement based on melamine-formaldehyde foam comprising the hollow microspheres according to claim 1; and
   b) rubbing the cleaning implement against a surface.

* * * * *